(12) United States Patent  
Doi (10) Patent No.: US 12,024,189 B2
(45) Date of Patent: Jul. 2, 2024

(54) DRIVING ASSISTANCE APPARATUS (71) Applicant: TOYOTA JIDOSHA KABUSHIKI KAISHA, Aichi-ken (JP)

(72) Inventor: Tomoyuki Doi, Susono (JP)

(73) Assignee: TOYOTA JIDOSHA KABUSHIKI KAISHA, Aichi-ken (JP)

( * ) Notice: Subject to any disclaimer, the term of this patent is extended or adjusted under 35 U.S.C. 154(b) by 0 days.

(21) Appl. No.: 18/314,138

(22) Filed: May 9, 2023

(65) Prior Publication Data

US 2023/0271625 A1  Aug. 31, 2023

Related U.S. Application Data

(63) Continuation of application No. 17/135,837, filed on Dec. 28, 2020, now Pat. No. 11,724,712.

(30) Foreign Application Priority Data

Feb. 26, 2020 (JP) .................................. 2020-030637

(51) Int. Cl.
*B60W 50/14* (2020.01)
*B60K 31/00* (2006.01)
(Continued)

(52) U.S. Cl.
CPC ......... *B60W 50/14* (2013.01); *B60K 31/0008* (2013.01); *B60K 35/00* (2013.01);
(Continued)

(58) Field of Classification Search
None
See application file for complete search history.

(56) References Cited

U.S. PATENT DOCUMENTS 7,734,404 B2 * 6/2010 Shiiba ................ B60K 31/0066
701/72
9,150,223 B2 * 10/2015 Minemura .......... B60W 30/095
(Continued)

FOREIGN PATENT DOCUMENTS

BR    102018014616 A2     3/2019
BR    102018014616 A2 *   3/2019  ................ B60T 7/22
(Continued)

OTHER PUBLICATIONS

Notice of Allowance in U.S. Appl. No. 18/314,140, mailed Apr. 30, 2024, 5pp.

*Primary Examiner* — Kevin R Steckbauer
(74) *Attorney, Agent, or Firm* — HAUPTMAN HAM, LLP (57) ABSTRACT

A driving assistance apparatus includes a controller programmed to perform a deceleration assistance process of assisting in decelerating a vehicle before the vehicle arrives at a deceleration object, and to control a display apparatus to display, in a first display area, first notification information for notifying an occupant of the vehicle of the deceleration object that is a target for the deceleration assistance process. When a first object and a second object that is different from the first object are both detected as the deceleration object and the second object is the target for the deceleration assistance process but the first object is not the target for the deceleration assistance process, the controller is programmed to control the display apparatus to display, in a second display area, second notification information for notifying the occupant of the first object, the second display area is different from the first display area.

11 Claims, 5 Drawing Sheets

(51) Int. Cl.
| | |
|---|---|
| *B60K 35/00* | (2024.01) |
| *B60T 7/12* | (2006.01) |
| *B60W 30/09* | (2012.01) |
| *B60W 30/095* | (2012.01) |
| *B60W 30/14* | (2006.01) |
| *B60W 30/16* | (2020.01) |
| *B60W 30/18* | (2012.01) |
| *G06V 20/58* | (2022.01) |
| *B60K 35/28* | (2024.01) |
| *B60K 35/29* | (2024.01) |
| *B60K 35/81* | (2024.01) |
| *G08G 1/0962* | (2006.01) |
| *G08G 1/0967* | (2006.01) |
| *G08G 1/16* | (2006.01) |

(52) U.S. Cl.
CPC ............... *B60T 7/12* (2013.01); *B60W 30/09* (2013.01); *B60W 30/0956* (2013.01); *B60W 30/146* (2013.01); *B60W 30/16* (2013.01); *B60W 30/181* (2013.01); *B60W 30/18109* (2013.01); *B60W 30/18154* (2013.01); *G06V 20/582* (2022.01); *G06V 20/584* (2022.01); *B60K 2031/0016* (2013.01); *B60K 31/0058* (2013.01); *B60K 35/28* (2024.01); *B60K 35/29* (2024.01); *B60K 35/81* (2024.01); *B60K 2360/178* (2024.01); *B60K 2360/179* (2024.01); *B60K 2360/1868* (2024.01); *B60W 2050/146* (2013.01); *B60W 2554/00* (2020.02); *B60W 2554/20* (2020.02); *B60W 2554/4026* (2020.02); *B60W 2554/4029* (2020.02); *B60W 2554/802* (2020.02); *B60W 2555/60* (2020.02); *G08G 1/09623* (2013.01); *G08G 1/09626* (2013.01); *G08G 1/096725* (2013.01); *G08G 1/165* (2013.01); *G08G 1/166* (2013.01)

(56) References Cited

U.S. PATENT DOCUMENTS

| | | | | |
|---|---|---|---|---|
| 9,415,775 | B2 * | 8/2016 | Sato | B60W 30/14 |
| 9,802,622 | B2 * | 10/2017 | Park | B60W 50/10 |
| 9,855,947 | B1 * | 1/2018 | Penilla | G08G 1/096725 |
| 9,987,986 | B2 * | 6/2018 | Matsuoka | B60R 1/00 |
| 10,023,230 | B2 * | 7/2018 | Sato | B62D 15/0265 |
| 10,071,747 | B2 * | 9/2018 | Roth | H04N 9/31 |
| 10,210,405 | B2 * | 2/2019 | Yokochi | G06V 10/811 |
| 10,259,438 | B2 * | 4/2019 | Goto | B60T 7/042 |
| 10,597,013 | B2 * | 3/2020 | Adachi | B60W 50/0097 |
| 10,710,611 | B2 * | 7/2020 | Park | B60K 35/29 |
| 10,845,809 | B2 * | 11/2020 | Imai | G08G 1/16 |
| 10,924,679 | B2 * | 2/2021 | Lee | G06V 20/56 |
| 11,008,007 | B2 * | 5/2021 | Tochigi | B60W 30/162 |
| 11,237,390 | B2 * | 2/2022 | Watanabe | B60K 35/00 |
| 11,242,068 | B2 * | 2/2022 | Choi | B60W 40/08 |
| 11,433,888 | B2 * | 9/2022 | Ito | B60W 30/09 |
| 2006/0190158 | A1 * | 8/2006 | Shiiba | B60K 31/0066 |
| | | | | 701/70 |
| 2010/0082252 | A1 * | 4/2010 | Asanuma | G08G 1/005 |
| | | | | 701/301 |
| 2011/0196580 | A1 * | 8/2011 | Xu | B60W 50/14 |
| | | | | 340/905 |
| 2014/0343750 | A1 * | 11/2014 | Minemura | B60W 50/04 |
| | | | | 701/1 |
| 2015/0274162 | A1 * | 10/2015 | Sato | B60W 30/16 |
| | | | | 701/1 |
| 2015/0291216 | A1 * | 10/2015 | Sato | B60W 30/0956 |
| | | | | 701/41 |
| 2015/0331238 | A1 * | 11/2015 | Roth | H04W 4/16 |
| | | | | 348/115 |
| 2016/0349066 | A1 * | 12/2016 | Chung | G01C 21/365 |
| 2017/0129401 | A1 * | 5/2017 | Matsuoka | B60Q 9/008 |
| 2017/0177957 | A1 * | 6/2017 | Yokochi | B60K 35/00 |
| 2017/0187963 | A1 * | 6/2017 | Lee | G02B 27/01 |
| 2017/0297547 | A1 * | 10/2017 | Goto | B60T 13/745 |
| 2019/0016346 | A1 * | 1/2019 | Park | B60W 50/16 |
| 2019/0031163 | A1 * | 1/2019 | Adachi | G01S 17/931 |
| 2019/0299990 | A1 * | 10/2019 | Tochigi | B60T 7/22 |
| 2019/0317499 | A1 * | 10/2019 | Imai | B60W 30/10 |
| 2020/0361482 | A1 * | 11/2020 | Choi | G01C 21/365 |
| 2021/0139020 | A1 * | 5/2021 | Ikezawa | B60W 30/0956 |
| 2021/0171032 | A1 * | 6/2021 | Ito | B60W 30/09 |
| 2021/0261149 | A1 * | 8/2021 | Doi | B60K 31/0008 |
| 2021/0341736 | A1 * | 11/2021 | Watanabe | B60K 35/28 |
| 2022/0080829 | A1 * | 3/2022 | Choi | B60K 35/00 |
| 2022/0176950 | A1 * | 6/2022 | Schraga, Sr. | B60W 10/04 |

FOREIGN PATENT DOCUMENTS

| | | | | |
|---|---|---|---|---|
| CA | 2884808 | C * | 5/2019 | ............ B60W 10/18 |
| CA | 2884808 | C | 5/2019 | |
| CN | 106205175 | A | 12/2016 | |
| CN | 106915302 | A | 7/2017 | |
| CN | 108944864 | A | 12/2018 | |
| CN | 108944864 | A * | 12/2018 | ............... B60T 7/22 |
| CN | 110316191 | A | 10/2019 | |
| CN | 109318878 | B | 11/2020 | |
| CN | 109318878 | B * | 11/2020 | ............... B60T 7/22 |
| CN | 112601976 | A * | 4/2021 | ........ B60W 30/0956 |
| CN | 112601976 | A | 4/2021 | |
| CN | 112874514 | A | 6/2021 | |
| CN | 112874514 | A * | 6/2021 | ............ B60W 30/08 |
| CN | 113306565 | A * | 8/2021 | ......... B60K 31/0008 |
| CN | 113306565 | A | 8/2021 | |
| CN | 113474225 | A | 10/2021 | |
| CN | 113474225 | A * | 10/2021 | ............... B60Q 9/00 |
| DE | 10326358 | B4 | 2/2013 | |
| DE | 10326358 | B4 * | 2/2013 | ............ B60K 28/10 |
| DE | 10326358 | B9 * | 5/2013 | ............ B60K 28/10 |
| DE | 10326358 | B9 | 5/2013 | |
| DE | 102019107661 | A1 * | 10/2019 | ............... B60T 7/12 |
| DE | 102020129146 | A1 * | 5/2021 | ............ B60W 30/08 |
| DE | 102020129146 | A1 | 5/2021 | |
| DE | 102019107661 | B4 | 2/2023 | |
| EP | 2339562 | A1 * | 6/2011 | ............ B60K 35/00 |
| EP | 2339562 | A1 | 6/2011 | |
| EP | 2335990 | B1 * | 7/2014 | ............. B60L 50/16 |
| EP | 2335990 | B1 | 7/2014 | |
| EP | 3446940 | A1 | 2/2019 | |
| EP | 3446940 | A1 * | 2/2019 | ............... B60T 7/22 |
| FR | 3068945 | B1 * | 8/2019 | ............ B60K 35/00 |
| FR | 3068945 | B1 | 8/2019 | |
| JP | 2002120742 | A | 4/2002 | |
| JP | 2002120742 | A * | 4/2002 | ............... B62D 1/00 |
| JP | 2002329298 | A * | 11/2002 | |
| JP | 2002329298 | A | 11/2002 | |
| JP | 2004355324 | A * | 12/2004 | |
| JP | 2004355324 | A | 12/2004 | |
| JP | 3684776 | B2 * | 8/2005 | ........... G01S 13/931 |
| JP | 3684776 | B2 | 8/2005 | |
| JP | 3724177 | B2 * | 12/2005 | |
| JP | 3724177 | B2 | 12/2005 | |
| JP | 3829627 | B2 * | 10/2006 | |
| JP | 3829627 | B2 | 10/2006 | |
| JP | 4340000 | B2 | 10/2009 | |
| JP | 4340000 | B2 * | 10/2009 | |
| JP | 2009-292296 | A | 12/2009 | |
| JP | 2009292296 | A * | 12/2009 | |
| JP | 4696339 | B2 | 6/2011 | |
| JP | 4696339 | B2 * | 6/2011 | |
| JP | 4698002 | B2 | 6/2011 | |
| JP | 4698002 | B2 * | 6/2011 | ............ B60K 35/00 |
| JP | 2016-46998 | A | 4/2016 | |
| JP | 2016046998 | A * | 4/2016 | ............ B61L 23/041 |
| JP | 2016110593 | A | 6/2016 | |
| JP | 2016110593 | A * | 6/2016 | |
| JP | 2017-87980 | A | 5/2017 | |
| JP | 2017087980 | A * | 5/2017 | ............ B60Q 9/008 |
| JP | 2017-117039 | A | 6/2017 | |
| JP | 2017117039 | A * | 6/2017 | ............ B60K 35/00 |
| JP | 6336857 | B2 | 6/2018 | |

(56) References Cited

FOREIGN PATENT DOCUMENTS

| | | | | |
|---|---|---|---|---|
| JP | 6336857 | B2 * | 6/2018 | ............ B61L 23/041 |
| JP | 2019-28523 | A | 2/2019 | |
| JP | 2019028523 | A * | 2/2019 | ................ B60T 8/72 |
| JP | 2019-93882 | A | 6/2019 | |
| JP | 2019093882 | A * | 6/2019 | |
| JP | 2019-113324 | A | 7/2019 | |
| JP | 2019113324 | A * | 7/2019 | |
| JP | 2019171964 | A | 10/2019 | |
| JP | 2019171964 | A * | 10/2019 | ................ B60T 7/12 |
| JP | 6658691 | B2 * | 3/2020 | ................ B60T 8/72 |
| JP | 6658691 | B2 | 3/2020 | |
| JP | 6724995 | B2 * | 7/2020 | ............ B60K 35/00 |
| JP | 6724995 | B2 | 7/2020 | |
| JP | 2021-75240 | A | 5/2021 | |
| JP | 2021075240 | A * | 5/2021 | ............ B60W 30/08 |
| JP | 2021133777 | A * | 9/2021 | ......... B60K 31/0008 |
| JP | 2021133777 | A | 9/2021 | |
| JP | 7013998 | B2 | 2/2022 | |
| JP | 7013998 | B2 * | 2/2022 | ................ B60T 7/12 |
| RU | 2010136223 | A | 3/2012 | |
| RU | 2010136223 | A * | 3/2012 | |
| TH | 1801004399 | A | 4/2019 | |
| TH | 1801004399 | A * | 4/2019 | ................ B60T 7/22 |
| WO | 2020170766 | A1 | 8/2020 | |
| WO | WO-2020170766 | A1 * | 8/2020 | ............... B60Q 9/00 |

\* cited by examiner

DRIVING ASSISTANCE APPARATUS

CROSS-REFERENCE TO RELATED APPLICATIONS

This application is a continuation of U.S. patent application Ser. No. 17/135,837, filed Dec. 28, 2020, which claims the benefit of priority of the prior Japanese Patent Application No. 2020-030637, filed on Feb. 26, 2020, the disclosures of which applications are hereby incorporated by reference herein in their entirety.

BACKGROUND

1. Technical Field

Embodiments of the present disclosure relate to a driving assistance apparatus that assists in decelerating a vehicle upon detection of a deceleration object, which indicates a necessity of decelerating the vehicle.

2. Description of the Related Art

An example of the driving assistance apparatus as described above is disclosed in Japanese Patent Application Laid Open No. 2019-093882 (Patent Literature 1). Specifically, the driving assistance apparatus disclosed in the Patent Literature 1 is configured to detect a stop position located ahead of a host vehicle and to perform an assistance operation of automatically decelerating the vehicle such that the vehicle will stop at the detected stop position. The driving assistance apparatus disclosed in the Patent Literature 1 is also configured to notify a driver of a start of the assistance operation.

SUMMARY

When a deceleration assistance process for assisting in decelerating the vehicle is performed, it is preferable to display a deceleration object that is a target for the deceleration assistance process (i.e., an object indicating the necessity of decelerating the vehicle, and for example, at least one of a preceding vehicle, a traffic light, and a road or traffic sign) to an occupant of the vehicle. That is because the occupant can recognize what type of deceleration object is the target for the deceleration assistance process.

Here, the deceleration object that is the target for the deceleration assistance process may change from a first deceleration object to a second deceleration object, which is newly detected. For example, when a preceding vehicle that cuts in front of the host vehicle is detected as the second deceleration object in the situation that the deceleration assistance process is performed for a traffic light that is detected as the first deceleration object, the deceleration object that is the target for the deceleration assistance process may change from the traffic light to the preceding vehicle. In this case, the second deceleration object, which is new target for the deceleration assistance process, is displayed to the occupant of the vehicle. On the other hand, the first deceleration object, which was so far the target for the deceleration assistance process, is also preferably displayed to the occupant of the vehicle. That is because it is preferable for the occupant to pay attention even to the first deceleration object, which was so far the target for the deceleration assistance process. Nevertheless, when the display of the first deceleration object that is not the target for the deceleration assistance process is continued in the situation that the deceleration assistance process is performed for the second deceleration object, then, the occupant possibly erroneously recognizes the deceleration object that is the target fro the deceleration assistance process, which is technically problematic.

It is therefore an object of embodiments of the present disclosure to provide a driving assistance apparatus configured to prevent the occupant from erroneously recognizing the deceleration object that is the target for the deceleration assistance process.

A driving assistance apparatus is provided with a controller, the controller is programmed to: perform a deceleration assistance process of assisting in decelerating a vehicle before the vehicle arrives at a deceleration object, which indicates a necessity of decelerating the vehicle, when the deceleration object is detected ahead of the vehicle; and control a display apparatus to display, in a first display area of the display apparatus, first notification information for notifying an occupant of the vehicle of the deceleration object that is a target for the deceleration assistance process, wherein when a first object and a second object that is different from the first object are both detected as the deceleration object and the second object is the target for the deceleration assistance process but the first object is not the target for the deceleration assistance process, the controller is programmed to control the display apparatus to display, in a second display area of the display apparatus, second notification information for notifying the occupant of the first object, the second display area is different from the first display area.

According to the driving assistance apparatus, the first notification information for notifying the occupant of the second object that is detected as the deceleration object and that is the target for the deceleration assistance process is displayed in the first display area, and the second notification information for notifying the occupant of the first object that is detected as the deceleration object and that is not the target for the deceleration assistance process is displayed in the second display area. This can prevent the occupant from erroneously recognizing the deceleration object that is the target for the deceleration assistance process.

DETAILED DESCRIPTION OF THE EMBODIMENT

Hereinafter, a driving assistance apparatus according to an embodiment of the present disclosure will be explained with reference to the drawings. The explanation below will be given with a vehicle 1 on which the driving assistance apparatus according to the embodiment is mounted.

(1) Configuration of Vehicle 1

Figure 1:
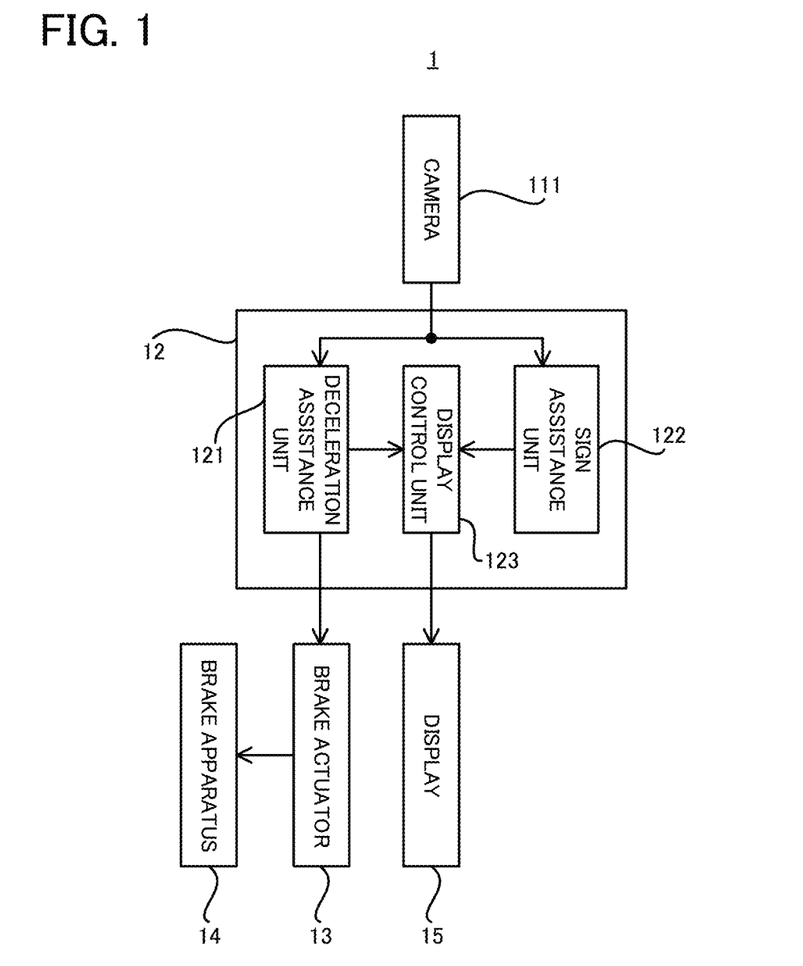
FIG. 1 is a block diagram illustrating a configuration of a vehicle according to an embodiment.

Firstly, with reference to FIG. 1, a configuration of the vehicle 1 according to the embodiment will be explained. FIG. 1 is a block diagram illustrating the configuration of the vehicle according to the embodiment.

As illustrated in FIG. 1, the vehicle 1 is provided with: a camera 11; an electronic control unit (ECU) 12; a brake actuator 13; a brake apparatus 14; and a display 15.

The camera 11 may be an imaging device configured to capture an image of a view ahead of the vehicle 1. An image captured by the camera 11 (i.e., an image indicating an external circumstance, condition or situation ahead of the vehicle 1) may be outputted from the camera 11 to the ECU 12.

The ECU 12 is configured to perform a deceleration assistance operation. The deceleration assistance operation may include a driving assistance operation for decelerating the vehicle 1 to a target speed before the vehicle 1 arrives at a target position. If the target speed is set to zero in the deceleration assistance operation, the deceleration assistance operation for decelerating the vehicle 1 to the target speed before the vehicle 1 arrives at the target position may be substantially equivalent to a stop assistance operation for stopping the vehicle 1 at the target position. Thus, in this embodiment, the "deceleration assistance operation" may also include the "stop assistance operation".

The ECU 12 is further configured to perform a sign assistance operation. The sign assistance operation may be a driving assistance operation of displaying a sign notification image for notifying an occupant of the vehicle 1 of at least one of a road sign and a traffic light that are detected ahead of the vehicle 1.

In order to perform the deceleration assistance operation and the sign assistance operation, the ECU 12 is provided, as processing blocks that are logically realized in the ECU 12, with: a deceleration assistance unit 121; a sign assistance unit 122; and a display control unit 123. An outline of the operation of each of the deceleration assistance unit 121, the sign assistance unit 122, and the display control unit 123 will be simply explained here and will be described in detail later (with reference to FIG. 3, FIG. 5, and so on). The deceleration assistance unit 121 is configured to detect a predetermined deceleration target from the image captured by the camera 11. The deceleration target indicates a necessity of decelerating the vehicle 1. The deceleration target is a specific example of the "deceleration object" in Supplementary Notes described later. Moreover, the deceleration assistance unit 121 is configured to control the brake actuator 13 such that the vehicle 1 is decelerated to the target speed before the vehicle 1 arrives at the deceleration target. The sign assistance unit 122 is configured to detect at least one of the road sign and the traffic light from the image captured by the camera 11. At least one of the road sign and the traffic light is an object for indicating or instructing the traffic of the vehicle 1 on a road, and may be thus referred to as a traffic indicator. The display control unit 123 is programmed to control the display 15 to display a sign notification image for notifying the occupant of the vehicle 1 of at least one of the road sign and the traffic light detected by the sign assistance unit 122. Moreover, the display control unit 123 is programmed to control the display 15 to display a deceleration notification image for notifying the occupant of the vehicle 1 of the deceleration target detected by the deceleration assistance unit 121.

The brake actuator 13 is configured to control the brake apparatus 14, which is configured to brake not-illustrated wheels, to apply a braking force to the vehicle 1, under the control of the deceleration assistance unit 121. As a result, the deceleration 1 may be decelerated. In other words, the vehicle 1 may be decelerated to the target speed before the vehicle 1 arrives at the target position without requiring an operation of a brake pedal by the occupant. Alternatively, the occupant is assisted in operating the brake pedal so as to decelerate the vehicle 1 to the target speed before the vehicle 1 arrives at the target position.

The display 15 may be a display apparatus configured to display a predetermined image. In this embodiment, as described above, the display 15 is configured to display the deceleration notification image for notifying the occupant of the vehicle 1 of the deceleration target, under the control of the display control unit 123. Moreover, the display 15 is configured to display the sign notification image for notifying the occupant of the vehicle 1 of at least one of the road sign and the traffic light, under the control of the display control unit 123.

Figure 2:
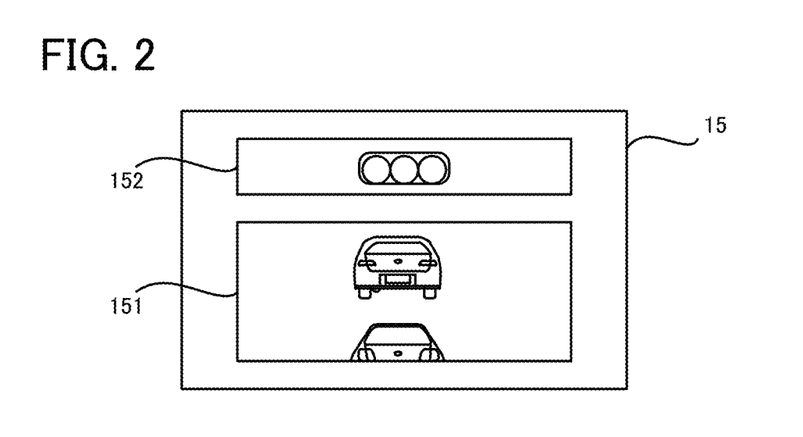
FIG. 2 is a plan view illustrating a deceleration notification image and a sign notification image displayed on a display.

Particularly in this embodiment, a display screen of the display 15 may include a deceleration display area 151 for displaying the deceleration notification image and a sign display area 152 for displaying the sign notification image. In other words, the display screen of the display 15 may be divided into the deceleration display area 151 for displaying the deceleration notification image and the sign display area 152 for displaying the sign notification image. Specifically, as illustrated in FIG. 2, which is a plan view illustrating a deceleration notification image and a sign notification image displayed on the display 15, the display 15 may display the deceleration notification image in the deceleration display area 151 and may display the sign notification image in the sign display area 152 that is different from the deceleration display area 151. FIG. 2 illustrates an example in which the deceleration notification image includes a drawing of a preceding vehicle as a specific example of the deceleration target (or an image of the deceleration target captured by the camera 11) and a drawing of the vehicle 1. FIG. 2 also illustrates an example in which the sign notification image includes a drawing of the traffic light (or an image of the traffic light captured by the camera 11).

At least one of the road sign and the traffic light detected by the sign assistance unit 122 may be the deceleration target in some cases. In other words, there is a possibility that the deceleration target detected by the deceleration assistance unit 121 is same as at least one of the road sign and the traffic light detected by the sign assistance unit 122. In this case, as described in detail later, the display 15 may display the deceleration notification image in the deceleration display area 151, but may not display the sign notification image in the sign display area 152, to avoid repetitive display. On the other hand, when the deceleration target detected by the deceleration assistance unit 121 is not same as at least one of the road sign and the traffic light detected by the sign assistance unit 122, the display 15 may display the deceleration notification image in the deceleration display area 151 and may display the sign notification image in the sign display area 152.

Visibility of the sign display area 152 may be lower than that of the deceleration display area 151. For example, the sign display area 152 may be smaller than the deceleration display area 151. For example, the sign display area 152 may be located farther from the center of the display screen of the display 15 than the deceleration display area 151. For example, luminance of the sign display area 152 may be less than that of the deceleration display area 151. For example, brightness of the sign display area 152 may be less than that of the deceleration display area 151. For example, resolution of the sign display area 152 may be less than that of the deceleration display area 151. However, the visibility of the sign display area 152 may be higher than or equal to that of the deceleration display area 151.

(2) Operations Performed by ECU 12

Next, the deceleration assistance operation and the sign assistance operation performed by the ECU 12 will be explained in order. The ECU 12 is typically configured to perform the deceleration assistance operation and the sign assistance operation in parallel.

(2-1) Deceleration Assistance Operation

Figure 3:
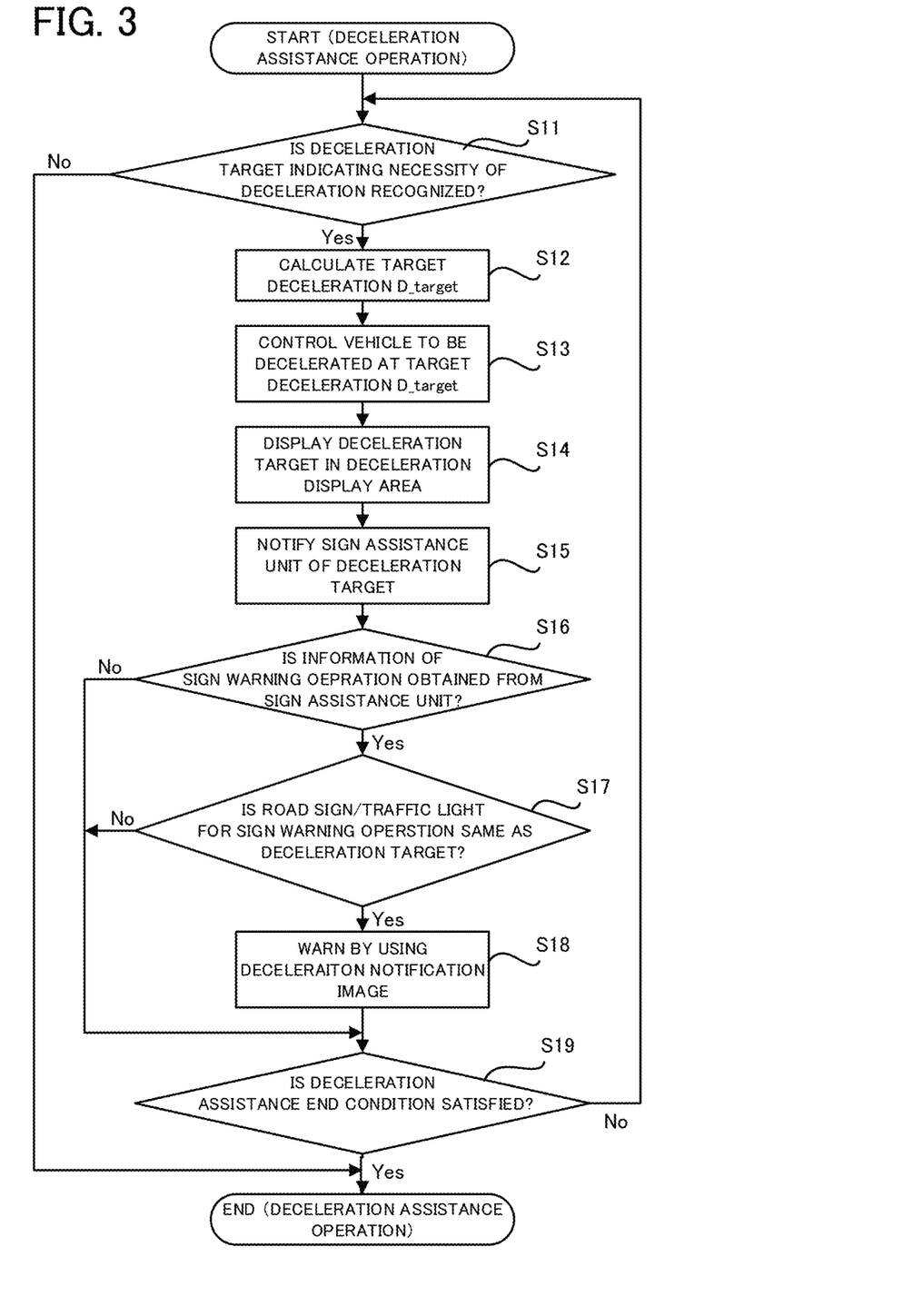
FIG. 3 is a flowchart illustrating a flow of a deceleration assistance operation.

Firstly, with reference to FIG. 3, the deceleration assistance operation performed by the ECU 12 will be explained. FIG. 3 is a flowchart illustrating a flow of the deceleration assistance operation performed by the ECU 12.

As illustrated in FIG. 3, the deceleration assistance unit 121 determines whether or not a predetermined deceleration target, which indicates the necessity of decelerating the vehicle 1 (or in other words, which directly or indirectly indicates or implies the necessity of decelerating the vehicle 1), is detected in the image captured by the camera 11 (step S11). The camera 11 may continue to capture the image of the view ahead of the vehicle 1 while the deceleration assistance operation illustrated in FIG. 3 is performed. Thus, the deceleration assistance unit 121 may continue to perform a process of detecting (or recognizing) the deceleration target in the image captured by the camera 11 while the deceleration assistance operation illustrated in FIG. 3 is performed.

As described above, in this embodiment, the deceleration assistance operation may also include the stop assistance operation. Thus, the deceleration target may include not only a target indicating the necessity of decelerating the vehicle 1, but also a target indicating a necessity of stopping the vehicle 1. At least one of a road sign (i.e., a sign placed on a road), a road marking (i.e., a marking drawn on a road surface), and a traffic light that require or recommend the deceleration or stop of the vehicle 1 according to laws and regulations may be an example of the deceleration target as described above. At least one of a road sign that requires a stop (i.e., a road sign indicating "STOP"), a road sign that requires slowdown, a road sign indicating the presence of a pedestrian crossing, a road sign indicating the presence of a school, and the like may be an example of the road sign as described above. At least one of a stop line indicating a stop position, a road marking indicating a stop prohibited part (e.g., a position near an entrance/exit of a police station or a fire station), a road marking indicating a school zone, a pedestrian crossing, a road marking that gives previous notice of the presence of a pedestrian crossing ahead, and the like may be an example of the road marking as described above. An object that does not require or recommend the deceleration or stop of the vehicle 1 according to laws and regulations, but implies a preference for the vehicle 1 that decelerates or stops, so as to avoid a collision with the vehicle 1 may be another example of the deceleration target. At least one of a preceding vehicle that drives ahead of the vehicle 1, another vehicle that is parked or stopped on the road ahead of the vehicle 1, a falling object on the road ahead of the vehicle 1, a structure that exists ahead of the vehicle 1 (e.g., a guardrail that exists ahead of the vehicle 1 that drives to a T-intersection, etc.) and the like may be an example of the object as described above.

As a result of the determination in the step S11, when it is determined that the deceleration target is not detected (the step S11: No), the ECU 12 ends the deceleration assistance operation illustrated in FIG. 3. If the deceleration assistance operation illustrated in FIG. 3 is ended, the ECU 12 restarts the deceleration assistance operation illustrated in FIG. 3 after a lapse of a predetermined period.

On the other hand, as a result of the determination in the step S11, when it is determined that the deceleration target is detected (the step S11: Yes), the deceleration assistance unit 121 calculates target deceleration D_target of the vehicle 1 (step S12). Specifically, the deceleration assistance unit 121 sets a target position at which the deceleration of the vehicle 1 should be completed, on the basis of the detected deceleration target. For example, the deceleration assistance unit 121 may set the target position at a position of the detected deceleration target. For example, the deceleration assistance unit 121 may set the target position at a position that is away from the position of the detected deceleration target toward the vehicle 1. The deceleration assistance unit 121 may then calculate the target deceleration D_target required to decelerate the vehicle 1 such that the speed of the vehicle 1 is a target speed V_target at a time point at which the vehicle 1 arrives at the target position. For example, the deceleration assistance unit 121 may calculate the target deceleration D_target by using an equation of D_target= $(V1-V\_target)^2/d1$ on the basis of a current vehicle speed V1 of the vehicle 1 and a distance d1 between a current position of the vehicle 1 (or a position at which the deceleration of the vehicle 1 should be actually started by the deceleration assistance operation) and the target position.

The deceleration assistance unit 121 then controls the vehicle 1 (and particularly, the brake actuator 13) such that the vehicle 1 is decelerated by the target deceleration D_target calculated in the step S12 (step S13). In other words, the deceleration assistance unit 121 controls the brake actuator 13 to apply, to the vehicle 1, a braking force that allows the vehicle 1 to be decelerated by the calculated target deceleration D_target. As a result, the vehicle 1 may be decelerated by the calculated target deceleration D_target. The deceleration assistance unit 121 may start to control the brake actuator 13 such that the vehicle 1 is decelerated by the calculated target deceleration D_target at a time point at which the vehicle 1 arrives at the position at which the deceleration of the vehicle 1 should be actually started by the deceleration assistance operation. Alternatively, the deceleration assistance unit 121 may start to control the brake actuator 13 such that the vehicle 1 is decelerated by the calculated target deceleration D_target at a time point at which the target deceleration D_target is calculated.

In the step S11, when the deceleration target is detected, the display control unit 123 further controls the display 15 to display the deceleration notification image for notifying the occupant of the detected deceleration target, in the deceleration display area 151 of the display 15 (step S14). The deceleration assistance unit 121 further notifies the sign assistance unit 122 of information about the deceleration target (step S15).

Depending on the situation of the vehicle 1, in the step S11, there is a possibility that a plurality of deceleration targets are detected. In this case, the deceleration assistance unit 121 may select one of the plurality of deceleration targets and may perform a process of the step S12 to the step S15 described above (hereinafter referred to as a "deceleration assistance process") for the selected one deceleration target. In other words, the deceleration assistance unit 121 may calculate the target deceleration D_target on the basis of the selected one deceleration target (the step S12) and may control the brake actuator 13 such that the vehicle 1 is decelerated by the target deceleration D_target calculated on the basis of the selected one deceleration target (the step S13). The display control unit 123 may control the display 15 to display the deceleration notification image for notifying the occupant of the selected one deceleration target (the step S14). The deceleration assistance unit 121 may notify the sign assistance unit 122 of information about the selected one deceleration target (the step S15). On the other hand, the deceleration assistance unit 121 may not perform the process of the step S12 to the step S15 described above (or the deceleration assistance process) for the remaining deceleration targets that are not selected from the plurality of deceleration targets.

The deceleration assistance unit 121 further determines whether or not information about a sign warning operation is obtained from the sign assistance unit 122 (step S16). The sign warning operation, which will be described in detail later in the explanation of the sign assistance operation, may be an operation for warning the occupant that the vehicle 1 is performing unintended behavior against the content of at least one of the road sign and the traffic light detected by the sign assistance operation, when it happens, by using the sign notification image displayed in the sign display area 152. For example, when the vehicle 1 is moving forward against the road sign detected by the sign assistance operation, which is a road sign indicating "STOP", the sign assistance unit 122 may perform the sign warning operation for waning the occupant that the vehicle 1 is moving forward against the road sign. For example, when the vehicle 1 is moving forward against the traffic light detected by the sign assistance operation, which is red, the sign assistance unit 122 may perform the sign warning operation for waning the occupant that the vehicle 1 is moving forward against the color of the traffic light.

As a result of the determination in the step S16, when it is determined that the information about the sign warning operation is obtained (the step S16: Yes), the deceleration assistance unit 121 determines whether or not at least one of the road sign and the traffic light detected by the sign assistance operation is same as the deceleration target detected in the step S11 (step S17). Information about at least one of the at least one of the road sign and the traffic light detected by the sign assistance operation may be included in the information about the sign warning operation.

As a result of the step S17, when at least one of the road sign and the traffic light that is the target for the sign warning operation is same as the deceleration target (step S17: Yes), the sign notification image is not displayed in the sign display area 152 as described above (and moreover, as described in detail later with reference to FIG. 5). As a result, the sign assistance unit 122 cannot perform the sign warning operation by using the sign notification image displayed in the sign display area 152. Thus, in this case, the deceleration assistance unit 121 warns the occupant that the vehicle 1 is performing unintended behavior, by using the deceleration notification image displayed in the deceleration display area 151 (step S18). In other words, the deceleration assistance unit 121 performs the sign warning operation, instead of the sign assistance unit 122.

Figure 4:
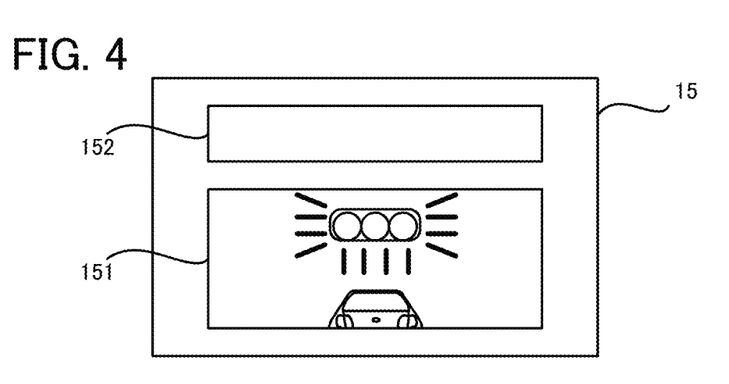
FIG. 4 is a plan view illustrating a deceleration notification image while a sign warning operation is performed.

Specifically, the deceleration assistance unit 121 instructs the display control unit 123 to perform the sign warning operation. The display control unit 123 controls the display 15 to warn the occupant that the vehicle 1 is performing unintended behavior, by controlling a display aspect of the deceleration notification image displayed in the deceleration display area 151. For example, the display control unit 123 may control the display 15 such that the deceleration notification image stands out more than the case where the sign warning operation is not performed. As an example, as illustrated in FIG. 4, the display control unit 123 may control the display 15 such that the deceleration notification image (and particularly, the drawing of at least one of the road sign and the traffic light) flickers in comparison with the case where the sign warning operation is not performed. In the same manner, when the sign assistance unit 122 performs the sign warning operation, the display control unit 123 may control the display 15 to warn the occupant that the vehicle 1 is performing unintended behavior, by controlling a display aspect of the sign notification image displayed in the deceleration display area 152.

On the other hand, as a result of the determination in the step S17, when at least one of the road sign and the traffic light that is the target for the sign warning operation is not same as the deceleration target (step S17: No), the sign notification image is not displayed in the sign display area 152. Thus, the sign assistance unit 122 can perform the sign warning operation by using the sign notification image displayed in the deceleration display area 152. Therefore, in this case, the deceleration assistance unit 121 may not perform the step S18. In other words, the deceleration assistance unit 121 may not perform the sign warning operation by using the sign notification image displayed in the deceleration display area 151.

On the other hand, as a result of the determination in the step S16, when it is determined that the information about the sign warning operation is not obtained (the step S16: No), the deceleration assistance unit 121 may not perform the step S17 and the step S18.

The deceleration assistance unit 121 then determines whether or not a predetermined deceleration assistance end condition, which should be satisfied to end the deceleration assistance operation, is satisfied (step S19). The deceleration assistance end condition may include such a first deceleration assistance end condition that the speed of the vehicle 1 is same as the target speed (i.e., that the speed is decreased to the target speed). The deceleration assistance end condition may include such a second deceleration assistance end condition that the vehicle 1 arrives at the target position. The deceleration assistance end condition may include such a third deceleration assistance end condition that the occupant has requested to end the deceleration assistance operation.

As a result of the determination in the step S19, when it is determined that the deceleration assistance end condition is satisfied (the step S19: Yes), the ECU 12 ends the deceleration assistance operation. On the other hand, as a result of the determination in the step S19, when it is determined that the deceleration assistance end condition is not satisfied (the step S19: No), the ECU 12 continues the deceleration assistance operation by repeating the step S11 to the step S19.

(2-2) Sign Assistance Operation

Figure 5:
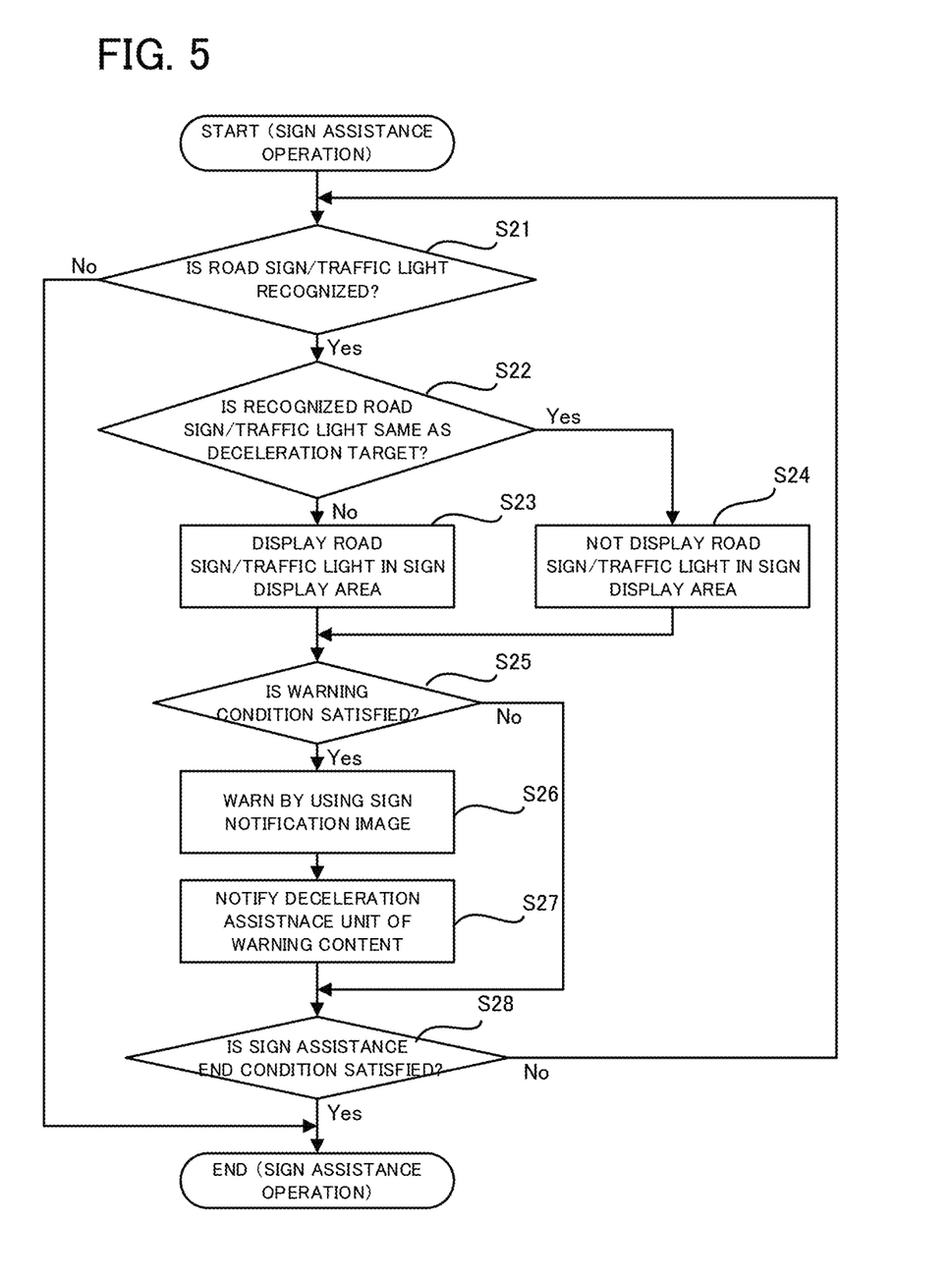
FIG. 5 is a flowchart illustrating a flow of a sign assistance operation.

Next, with reference to FIG. 5, the sign assistance operation performed by the ECU 12 will be explained. FIG. 5 is a flowchart illustrating a flow of the sign assistance operation performed by the ECU 12.

As illustrated in FIG. 5, the sign assistance unit 122 determines whether or not at least one of the road sign and the traffic light is detected in the image captured by the camera 11 (step S21). The camera 11 may continue to capture the image of the view ahead of the vehicle 1 while the sign assistance operation illustrated in FIG. 5 is performed. Thus, the sign assistance unit 122 may continue to perform a process of detecting (or recognizing) at least one of the road sign and the traffic light in the image captured by the camera 11 while the sign assistance operation illustrated in FIG. 5 is performed.

As a result of the determination in the step S21, when it is determined that at least one of the road sign and the traffic light is not detected (the step S21: No), the ECU 12 ends the sign assistance operation illustrated in FIG. 5. If the sign assistance operation illustrated in FIG. 5 is ended, the ECU 12 restarts the sign assistance operation illustrated in FIG. 5 after a lapse of a predetermined period.

On the other hand, as a result of the determination in the step S21, when it is determined that at least one of the road sign and the traffic light is detected (the step S21: Yes), the sign assistance unit 122 determines whether or not at least one of the road sign and the traffic light detected in the step S21 is same as the deceleration target detected in the deceleration assistance operation (step S22). If a plurality of deceleration targets are detected in the deceleration assistance operation, the sign assistance unit 122 may determine whether or not at least one of the road sign and the traffic light detected in the step S21 is same as one deceleration target that is selected as the target for the deceleration assistance process. The sign assistance unit 122 can specify the deceleration target detected in the deceleration assistance operation, on the basis of the information about the deceleration target notified from the deceleration assistance unit 121 (refer to the step S15 in FIG. 3).

Figure 6:
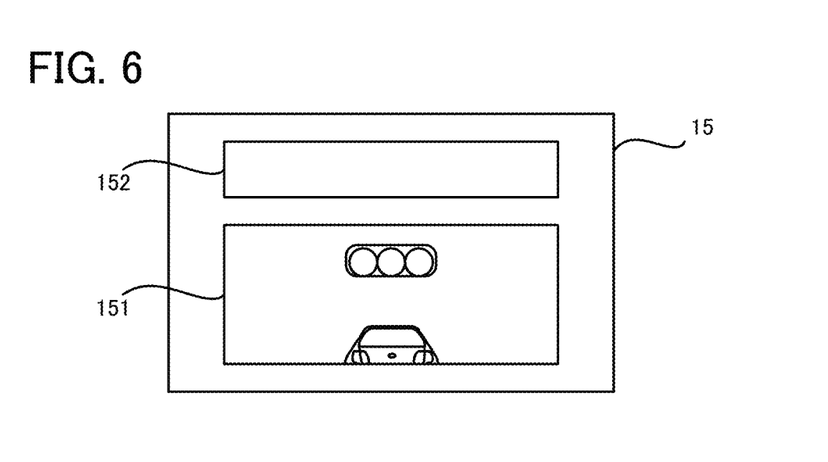
FIG. 6 is a plan view illustrating a display aspect of the display.

As a result of the determination in the step S22, when it is determined that at least one of the road sign and the traffic light detected is same as the deceleration target (the step S22: Yes), the sign notification image for notifying the occupant of at least one of the road sign and the traffic light detected in the step S21 is displayed in the deceleration display area 151 of the display 15, substantially, as the deceleration notification image for notifying the occupant of at least one of the road sign and the traffic light detected as the deceleration target. In this case, the display control unit 123 may not display the sign notification image for notifying the occupant of at least one of the road sign and the traffic light detected in the step S21, in the sign display area 152 of the display 15 (step S24). An example of the display 15 that displays the deceleration notification image, but does not display the sign notification image, is illustrated in FIG. 6. As a result, the same image that illustrates at least one of the same road sign and the same traffic light is not displayed, repetitively or redundantly.

On the other hand, as a result of the determination in the step S22, when it is determined that at least one of the road sign and the traffic light detected does not match the deceleration target (the step S22: No), the display control unit 123 displays the sign notification image for notifying the occupant of at least one of the road sign and the traffic light detected in the step S21, in the sign display area 152 of the display 15 (step S23). An example of the display 15 that displays both the deceleration notification image and the sign notification image is illustrated in FIG. 2 described above.

Then, the sign assistance unit 122 determines whether or not a warning condition, which should be satisfied at the start of the sign warning operation described above, is satisfied (step S25). The warning condition may include, for example, such a condition that the vehicle 1 is performing unintended behavior against the content of at least one of the road sign and the traffic light detected in the step S21.

As a result of the determination in the step S25, when it is determined that the warning condition is satisfied (the step S25: Yes), the sign assistance unit 122 warns the occupant that the vehicle 1 is performing unintended behavior, by using the sign notification image displayed in the sign display area 152 (step S26). Specifically, the sign assistance unit 122 instructs the display control unit 123 to perform the sign warning operation. The display control unit 123 controls the display 15 to warn the occupant that the vehicle 1 is performing unintended behavior, by controlling the display aspect of the sign notification image displayed in the sign display area 152. For example, the display control unit 123 may control the display 15 such that the sign notification image stands out more than when the sign warning operation is not performed.

When the sign notification image is not displayed because at least one of the road sign and the traffic light detected in the above manner is same as the deceleration target, the display control unit 123 may not perform the sign warning operation by using the sign notification image. In this case, as described above, the display control unit 123 may perform the sign warning operation by using the deceleration notification image.

Moreover, when the sign waring operation is performed, the sign assistance unit 122 notifies the deceleration assistance unit 121 of the information about the sign warning operation (step S27). The information about the sign warning operation is used, as descried above, to determine whether or not the deceleration assistance unit 121 performs the sign warning operation in the deceleration assistance operation. The information about the sign warning operation may include, for example, information indicating whether or not the sign warning operation is performed. The information about the sign warning operation may include information about at least one of the road sign and the traffic light that is the target for the sign warning operation (i.e., detected in the step S21).

On the other hand, as a result of the determination in the step S25, when it is determined that the warning condition is not satisfied (the step S25: No), the sign assistance unit 122 may not perform the step S26 and the step S27.

The sign assistance unit 122 then determines whether or not a predetermined sign assistance end condition, which should be satisfied to end the sign assistance operation, is satisfied (step S28). The sign assistance end condition may include such a condition that the occupant has requested to end the sign assistance operation. As a result of the determination in the step S28, when it is determined that the sign assistance end condition is satisfied (the step S28: Yes), the ECU 12 ends the sign assistance operation. On the other hand, as a result of the determination in the step S28, when it is determined that the sign assistance end condition is not satisfied (the step S28: No), the ECU 12 continues the sign assistance operation by repeating the step S21 to the step S28.

(2-3) Specific Examples of Display Aspects of Display 15

Next, an explanation will be given to the display aspects of the display 15 in the situation that the deceleration assistance operation and the sign assistance operation described above are performed in parallel, by using an example of a specific driving scene of the vehicle 1.

(2-3-1) Display Aspect of Display 15 in First Driving Scene

Firstly, an explanation will be given to a first driving scene in which a preceding vehicle cuts in front of the vehicle 1 when the vehicle 1 is driving toward the traffic light (and particularly, a red light). In this case, before the preceding vehicle cuts in, the deceleration assistance unit 121 detects the traffic light as the deceleration target. Therefore, the deceleration assistance unit 121 performs the deceleration assistance process (and specifically, the process of the step S12 to the step S15 in FIG. 2) for the traffic light. Thus, the display 15 displays the deceleration notification image for notifying the occupant of the traffic light in the deceleration display area 151. Moreover, the sign assistance unit 122 detects the traffic light. The traffic light detected by the sign assistance unit 122, however, is same as the traffic light detected by the deceleration assistance unit 122 as the deceleration target. Thus, the display 15 may not display the sign notification image for notifying the occupant of the traffic light in the sign display area 152. In other words, the display 15 displays the deceleration notification image for notifying the occupant of the traffic light in the deceleration display area 151, but may not display the sign notification image for notifying the occupant of the traffic light in the sign display area 152, as illustrated in FIG. 6 described above.

Then, after the preceding vehicle cuts in, the deceleration assistance unit 121 detects the preceding vehicle as the deceleration target, in addition to the traffic light. In this case, since the preceding vehicle is closer to the vehicle 1 than the traffic light is, the deceleration assistance unit 121 selects the preceding vehicle, as one deceleration target that is the target for the deceleration assistance process. In other words, the one deceleration target that is the target for the deceleration assistance process changes from the traffic light to the preceding vehicle. As a result, the deceleration assistance unit 121 performs the deceleration assistance process for the preceding vehicle. Thus, the display 15 displays the deceleration notification image for notifying the occupant of the preceding vehicle in the deceleration display area 151. Meanwhile, since the deceleration target for the deceleration assistance process changes from the traffic light to the preceding vehicle, the traffic light detected by the sign assistance unit 122 is not same as the preceding vehicle detected by the deceleration assistance unit 121 as the deceleration target (and particularly, the preceding vehicle that is selected as the target for the deceleration assistance process). In this case, the display 15 displays the sign notification image for notifying the occupant of the traffic light in the sign display area 152. In other words, the display 15 displays the deceleration notification image for notifying the occupant of the preceding vehicle in the deceleration display area 151 and displays the sign notification image for notifying the occupant of the traffic light in the sign display area 152, as illustrated in FIG. 2 described above.

Here, if the deceleration notification image for notifying the occupant of the traffic light detected as the deceleration target remains displayed even after the deceleration target for the deceleration assistance process changes from the traffic light to the preceding vehicle, the deceleration notification image for notifying the occupant of both the traffic light and the preceding vehicle is displayed in the deceleration area 151 of the display 15. In this case, there is a possibility that the occupant misunderstands that the deceleration assistance process is performed for the traffic light, even though the deceleration assistance process is performed for the preceding vehicle. In this embodiment, however, after the deceleration target for the deceleration assistance process changes from the traffic light to the preceding vehicle, the deceleration notification image for notifying the occupant of the preceding vehicle is displayed, instead of the deceleration notification image for notifying the occupant of the traffic light. Thus, the occupant can appropriately recognize that the deceleration assistance process is performed for the preceding vehicle. In other words, the occupant does not erroneously recognize the deceleration target for the deceleration assistance process. Moreover, the occupant is notified of the traffic light that is no longer the target for the deceleration assistance process by the sign notification image instead of the deceleration notification image. Thus, the occupant can continuously pay attention to the traffic light that is no longer the target for the deceleration assistance process.

(2-3-2) Display Aspect of Display 15 in Second Driving Scene

Figure 7:
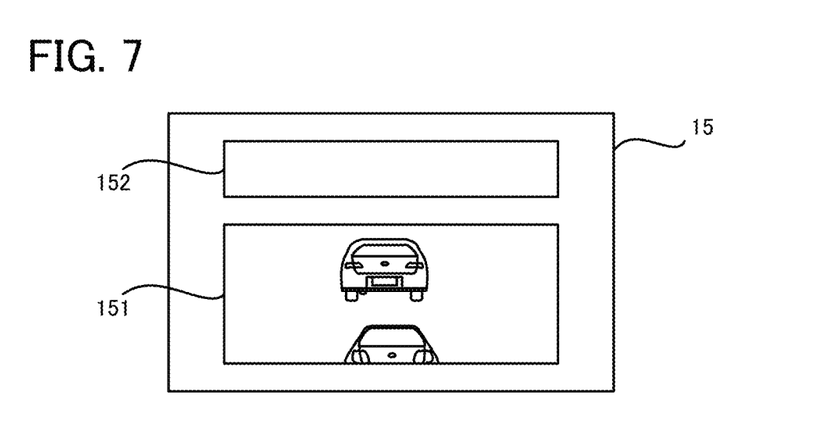
FIG. 7 is a plan view illustrating a display aspect of the display.

Secondly, an explanation will be given to a second driving scene in which the traffic light (and particularly, a red light) appears ahead of the vehicle 1 and a preceding vehicle when the vehicle 1 is driving after the preceding vehicle. In this case, before the traffic light appears ahead of the vehicle 1 and the preceding vehicle, the deceleration assistance unit 121 detects the preceding vehicle as the deceleration target. Thus, the deceleration assistance unit 121 performs the deceleration assistance process for the preceding vehicle. In other words, the display 15 displays the deceleration notification image for notifying the occupant of the preceding vehicle in the deceleration display area 151. Meanwhile, since the traffic light has not appeared ahead of the vehicle 1, the sign assistance unit 122 does not detect the traffic light. Thus, the display 15 does not display the sign notification image in the sign display area 152. In other words, the display 15 displays the deceleration notification image for notifying the occupant of the preceding vehicle in the deceleration display area 151, but does not display the sign notification image in the sign display area 152, as illustrated in FIG. 7.

Then, after the traffic light appears ahead of the vehicle 1 and the preceding vehicle, the deceleration assistance unit 121 detects the traffic light as the deceleration target, in addition to the preceding vehicle. In this case, since the preceding vehicle is closer to the vehicle 1 than the traffic light is, the deceleration assistance unit 121 selects the preceding vehicle, as one deceleration target for the deceleration assistance process. In other words, the one deceleration target for the deceleration assistance process does not change from the preceding vehicle to the traffic light. As a result, the deceleration assistance unit 121 continues to perform the deceleration assistance process for the preceding vehicle. Thus, the display 15 continues to display the deceleration notification image for notifying the occupant of the preceding vehicle in the deceleration display area 151. Moreover, the sign assistance unit 122 detects the traffic light. The traffic light detected by the sign assistance unit 122 is not same as the preceding vehicle detected by the deceleration assistance unit 121 as the deceleration target (and particularly, the preceding vehicle that is selected as the target for the deceleration assistance process). In this case, the display 15 displays the sign notification image for notifying the occupant of the traffic light in the sign display area 152. In other words, the display 15 displays the deceleration notification image for notifying the occupant of the preceding vehicle in the deceleration display area 151 and displays the sign notification image for notifying the occupant of the traffic light in the sign display area 152, as illustrated in FIG. 2 described above.

Then, after the preceding vehicle passes the traffic light, the traffic light is closer to the vehicle 1 than the preceding vehicle is. Thus, the deceleration assistance unit 121 selects the traffic light, as one deceleration target for the deceleration assistance process. In other words, the one deceleration target for the deceleration assistance process changes from the preceding vehicle to the traffic light. As a result, the deceleration assistance unit 121 performs the deceleration assistance process for the traffic light. Thus, the display 15 displays the deceleration notification image for notifying the occupant of the traffic light in the deceleration display area 151. Meanwhile, since the deceleration target for the deceleration assistance process changes from the preceding vehicle to the traffic light, the traffic light detected by the sign assistance unit 122 is same as the traffic light detected by the deceleration assistance unit 121 as the deceleration target (and particularly, the traffic light that is selected as the target for the deceleration assistance process). In this case, the display 15 may not display the sign notification image for notifying the occupant of the traffic light in the sign display area 152. In other words, the display 15 displays the deceleration notification image for notifying the occupant of the traffic light in the deceleration display area 151, but may not display the sign notification image for notifying the occupant of the traffic light in the sign display area 152, as illustrated in FIG. 6 described above.

Even in the second driving scene, as in the first driving scene, after the deceleration target for the deceleration assistance process changes from the preceding vehicle to the traffic light, the deceleration notification image for notifying the occupant of the traffic light is displayed, instead of the deceleration notification image for notifying the occupant of the preceding vehicle. Thus, the occupant can appropriately recognize that the deceleration assistance process is performed for the traffic light. In other words, the occupant does not erroneously recognize the deceleration target for the deceleration assistance process.

(3) Technical Effect

As explained above, on the vehicle 1 in this embodiment, after the deceleration target for the deceleration assistance process changes from a first deceleration target to a second deceleration target, the deceleration notification image for notifying the occupant of the second deceleration target is displayed, instead of the deceleration notification image for notifying the occupant of the first deceleration target. Thus, the occupant can appropriately recognize that the deceleration assistance process is performed for the second deceleration target. In other words, the occupant does not erroneously recognize the deceleration target for the deceleration assistance process. Moreover, when the first deceleration target that is no longer the target for the deceleration assistance process is at least one of the road sign and the traffic light, the sign notification image for notifying the occupant of at least one of the road sign and the traffic light that is the first deceleration target is displayed. Thus, the occupant can continuously pay attention to at least one of the road sign and the traffic light that is no longer the target for the deceleration assistance process.

Moreover, when the deceleration target detected by the deceleration assistance unit 121 (and particularly, the deceleration target for the deceleration assistance process) is same as at least one of the road sign and the traffic light detected by the sign assistance unit 122, the deceleration notification image for notifying the occupant of the traffic light is displayed, but the sign notification image for notifying the occupant of the traffic light is no longer displayed. Thus, the deceleration notification image and the sign notification image for notifying the occupant of the traffic light are not displayed, repetitively or redundantly. Therefore, the occupant does not feel annoyed about repetitive or redundant display.

Moreover, the visibility of the sign display area 152 may be lower than that of the deceleration display area 151, as described above. In this case, the occupant's eyes or line of sight can be easily guided to the deceleration target for the deceleration assistance process, which is more important for the occupant. Since the occupant can appropriately recognize the deceleration target, the occupant can recognize that a change in behavior of the vehicle 1 caused by the deceleration assistance process is a change in behavior caused by the deceleration assistance process that is performed for the deceleration target. Therefore, the occupant less likely feels anxious about the change in behavior of the vehicle 1.

(4) Other Modified Examples

In the explanation described above, in the deceleration assistance operation, the deceleration target is detected from the image captured by the camera 11, which indicates an external circumstance, condition or situation ahead of the vehicle 1. The deceleration target, however, may be detected in another way. For example, the deceleration target may be detected from a detection result of a radar or LIDAR (Laser Imaging Detection and Ranging).

In the explanation described above, in the sign assistance operation, at least one of the road sign and the traffic light is detected from the image captured by the camera 11, which indicates an external circumstance, condition or situation ahead of the vehicle 1. At least one of the road sign and the traffic light, however, may be detected in another way. For example, at least one of the road sign and the traffic light may be detected from a detection result of a radar or LIDAR.

(5) Supplementary Notes

Relating to the embodiment described above, the following supplementary notes will be further disclosed.

(5-1) Supplementary Note 1

A driving assistance apparatus according to the supplementary note 1 is a driving assistance apparatus provided with: a controller, the controller is programmed to: perform a deceleration assistance process of assisting in decelerating a vehicle before the vehicle arrives at a deceleration object, which indicates a necessity of decelerating the vehicle, when the deceleration object is detected ahead of the vehicle; and control a display apparatus to display, in a first display area of the display apparatus, first notification information for notifying an occupant of the vehicle of the deceleration object that is a target for the deceleration assistance process, wherein when a first object and a second object that is different from the first object are both detected as the deceleration object and the second object is the target for the deceleration assistance process but the first object is not the target for the deceleration assistance process, the controller is programmed to control the display apparatus to display, in a second display area of the display apparatus, second notification information for notifying the occupant of the first object, the second display area is different from the first display area.

(5-2) Supplementary Note 2

A driving assistance apparatus according to the supplementary note 2 is the driving assistance apparatus according to the supplementary note 1, wherein visibility of the second display area is lower than that of the first display area.

(5-3) Supplementary Note 3

A driving assistance apparatus according to the supplementary note 3 is the driving assistance apparatus according to the supplementary note 1 or 2, wherein the first object includes at least one of a road sign and a traffic light, and the second object includes an object that is different from the road sign and the traffic light.

(5-4) Supplementary Note 4

A driving assistance apparatus according to the supplementary note 4 is the driving assistance apparatus according to at least one of the supplementary note 1 to 3, wherein the controller is programmed to control the display apparatus to display, in the second display area, third notification information for notifying the occupant of a traffic indicator when the traffic indicator is detected ahead of the vehicle, the traffic indicator includes at least one of a road sign and a traffic light, and when the traffic indicator is detected as the deceleration object and the traffic indicator is the target for the deceleration assistance process, the controller is programmed to control the display apparatus to display the first notification information in the first area but not to display the third notification information in the second display area, and when an object that is different from the traffic indicator is detected as the deceleration object, the controller is programmed to control the display apparatus to display the first notification information in the first display area and to display the third notification information in the second display area.

The present disclosure may be embodied in other specific forms without departing from the spirit or characteristics thereof. The present embodiments and examples are therefore to be considered in all respects as illustrative and not restrictive, the scope of the disclosure being indicated by the appended claims rather than by the foregoing description and all changes which come in the meaning and range of equivalency of the claims are therefore intended to be embraced therein.

What is claimed is:

1. A driving assistance apparatus, comprising a controller configured to:
   in response to detecting at least one deceleration object ahead of a vehicle, the at least one deceleration object indicating a necessity of decelerating the vehicle,
      perform a deceleration assistance process of assisting in decelerating the vehicle before the vehicle arrives at the at least one deceleration object;
   detect, as the at least one deceleration object, a first object and a second object, the second object being different from the first object;
   in response to detecting the first and second objects, select one of the first object and the second object as a target for the deceleration assistance process; and
   in response to (i) not selecting the first object as the target for the deceleration assistance process and (ii) selecting the second object as the target for the deceleration assistance process,
      select a first display area of a display apparatus as an area for displaying first notification information indicating the second object,
      select a second display area of the display apparatus as an area for displaying second notification information indicating the first object,
      cause the display apparatus to display the first notification information in the first display area, and
      cause the display apparatus to display the second notification information in the second display area.

2. The driving assistance apparatus according to claim 1, wherein
   the controller is configured to control a configuration of the first display area to be different from that of the second display area, the configuration including at least one of visibility, luminance, brightness, or resolution.

3. The driving assistance apparatus according to claim 1, wherein
   the controller is configured to control a visibility of the second display area to be lower than that of the first display area.

4. The driving assistance apparatus according to claim 1, wherein
   the first object includes a road sign or a traffic light, and
   the second object includes an object that is different from the road sign and the traffic light.

5. The driving assistance apparatus according to claim 1, wherein
   the controller is configured to, in response to a traffic indicator being detected ahead of the vehicle, cause the display apparatus to display, in the second display area, third notification information for notifying an occupant of the vehicle of the traffic indicator, and
   the traffic indicator includes a road sign or a traffic light.

6. The driving assistance apparatus according to claim 5, wherein
   the controller is configured to, in response to the traffic indicator being detected as the at least one deceleration object and the traffic indicator being the target for the deceleration assistance process, cause the display apparatus to display the first notification information in the first area but not to display the third notification information in the second display area.

7. The driving assistance apparatus according to claim 5, wherein
   the controller is configured to, in response to detecting an object being different from the traffic indicator as the at least one deceleration object, cause the display apparatus to display the first notification information in the first display area and to display the third notification information in the second display area.

8. A driving assistance apparatus, comprising a controller, the controller being configured to:
   perform a deceleration assistance process of assisting in decelerating a vehicle before the vehicle arrives at a deceleration object, which indicates a necessity of decelerating the vehicle, when the deceleration object is detected ahead of the vehicle;
   detect a first object and a second object, the first object and the second object being the deceleration objects, the second object being different from the first object;
   in response to detecting the first and second objects, select one of the first object and the second object as a target for the deceleration assistance process;
   in response to (i) not selecting the first object is as the target for the deceleration assistance process and (ii) selecting the second object as the target for the deceleration assistance process, select a first display area of a display apparatus as an area for displaying first notification information indicating the second object, and select a second display area of the display apparatus as an area for displaying second notification information indicating the first object;

transmit, to the display apparatus, a command to cause the display apparatus to display the first notification information on the first display area; and transmit, to the display apparatus, a command to cause the display apparatus to display the second notification information on the second display area.

9. The driving assistance apparatus according to claim 1, wherein the first display area is larger than the second display area.

10. The driving assistance apparatus according to claim 1, wherein a period in which the first notification information is displayed overlaps a period in which the second notification information is displayed.

11. A driving assistance apparatus, comprising a controller configured to:

in response to detecting at least one deceleration object ahead of a vehicle, the at least one deceleration object indicating a necessity of decelerating the vehicle, perform a deceleration assistance process of assisting in decelerating the vehicle before the vehicle arrives at the at least one deceleration object;

detect, as the at least one deceleration object, a first object and a second object, the second object being different from the first object;

determine whether the first object is a target for the deceleration assistance process;

determine whether the second object is the target for the deceleration assistance process; and in response to determining that (i) the first object is not the target for the deceleration assistance process and (ii) the second object is the target for the deceleration assistance process, select a first display area of a display apparatus as an area for displaying first notification information indicating the second object, select a second display area of the display apparatus as an area for displaying second notification information indicating the first object, cause the display apparatus to display the first notification information in the first display area, and cause the display apparatus to display the second notification information in the second display area, wherein the controller is configured to, in response to a traffic indicator being detected ahead of the vehicle, cause the display apparatus to display, in the second display area, third notification information for notifying an occupant of the vehicle of the traffic indicator, the traffic indicator includes a road sign or a traffic light, and the controller is configured to, in response to the traffic indicator being detected as the at least one deceleration object and the traffic indicator being the target for the deceleration assistance process, cause the display apparatus to display the first notification information in the first area but not to display the third notification information in the second display area.

* * * * *